United States Patent
Hwang et al.

(10) Patent No.: US 10,727,992 B2
(45) Date of Patent: Jul. 28, 2020

(54) METHOD FOR ESTIMATING INDEX OF SYMBOL IN WIRELESS COMMUNICATION SYSTEM AND APPARATUS THEREFOR

(71) Applicant: LG ELECTRONICS INC., Seoul (KR)

(72) Inventors: Seunggye Hwang, Seoul (KR); Kijun Kim, Seoul (KR); Bonghoe Kim, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/085,479

(22) PCT Filed: Mar. 14, 2017

(86) PCT No.: PCT/KR2017/002728
§ 371 (c)(1),
(2) Date: Sep. 14, 2018

(87) PCT Pub. No.: WO2017/160050
PCT Pub. Date: Sep. 21, 2017

(65) Prior Publication Data
US 2019/0074941 A1 Mar. 7, 2019

Related U.S. Application Data

(60) Provisional application No. 62/308,216, filed on Mar. 15, 2016.

(51) Int. Cl.
*H04B 7/06* (2006.01)
*H04L 5/00* (2006.01)
(Continued)

(52) U.S. Cl.
CPC ......... *H04L 5/0012* (2013.01); *H04B 1/7156* (2013.01); *H04J 11/0073* (2013.01);
(Continued)

(58) Field of Classification Search
None
See application file for complete search history.

(56) References Cited

U.S. PATENT DOCUMENTS

2009/0046671 A1* 2/2009 Luo ............... H04J 11/0069
370/336
2010/0195566 A1 8/2010 Krishnamurthy et al.
(Continued)

FOREIGN PATENT DOCUMENTS

WO WO 2011/042066 A1 4/2011

OTHER PUBLICATIONS

U.S. Appl. No. 62/307,005, filed Mar. 11, 2016 (Year: 2016).*

*Primary Examiner* — Sithu Ko
(74) *Attorney, Agent, or Firm* — Birch, Stewart, Kolasch & Birch, LLP

(57) ABSTRACT

The present invention discloses a method for estimating an index of a symbol in a wireless communication system and an apparatus therefor. Specifically, a method for estimating an index of a symbol by a terminal in a wireless communication system comprises the steps of: receiving, from a base station, one or more specific synchronization signals through one or more symbols; identifying the indices corresponding to the one or more symbols, based on a predefined pattern configured with multiple specific synchronization signals for a specific time unit and the received one or more specific synchronization signals; and receiving, from the base station, a specific signal, through a specific symbol determined using the identified indices.

15 Claims, 13 Drawing Sheets

(51) Int. Cl.
  *H04L 27/26* (2006.01)
  *H04B 1/7156* (2011.01)
  *H04J 11/00* (2006.01)
  *H04W 48/16* (2009.01)

(52) U.S. Cl.
  CPC ...... *H04J 11/0076* (2013.01); *H04L 27/2613* (2013.01); *H04L 27/2656* (2013.01); *H04L 27/2666* (2013.01); *H04L 27/2692* (2013.01); *H04W 48/16* (2013.01)

(56) References Cited

U.S. PATENT DOCUMENTS

| | | |
|---|---|---|
| 2011/0228886 A1 | 9/2011 | Li et al. |
| 2012/0134404 A1 | 5/2012 | Strait |
| 2015/0016339 A1 | 1/2015 | You et al. |
| 2015/0092768 A1* | 4/2015 | Ng ............... H04W 48/16 370/350 |
| 2016/0277225 A1* | 9/2016 | Frenne ............ H04W 56/0015 |
| 2017/0257139 A1* | 9/2017 | Axnas ............. H04L 5/0007 |
| 2017/0279553 A1* | 9/2017 | Sadiq ............. H04J 11/0069 |
| 2018/0176065 A1* | 6/2018 | Deng ............. H04B 7/0695 |
| 2018/0220360 A1* | 8/2018 | Sheng ............ H04W 48/10 |
| 2018/0241458 A1* | 8/2018 | Jung ............. H04B 17/309 |
| 2018/0309533 A1* | 10/2018 | Yoshimoto ........ H04L 27/2613 |
| 2018/0343091 A1* | 11/2018 | Xia ............. H04L 1/1861 |
| 2019/0182784 A1* | 6/2019 | Harada ............ H04W 52/0219 |

* cited by examiner

SSS PCI group index pattern for partial time unit 2

(b)

SSS PCI group index pattern for partial time unit 1

(a) full time unit (14 symbols)

(b) 2 partial time unit (7 symbols)

(c) 7 partial time unit (2 symbols)

METHOD FOR ESTIMATING INDEX OF SYMBOL IN WIRELESS COMMUNICATION SYSTEM AND APPARATUS THEREFOR

CROSS REFERENCE TO RELATED APPLICATIONS

This application is the National Phase of PCT International Application No. PCT/KR2017/002728, filed on Mar. 14, 2017, which claims priority under 35 U.S.C. 119(e) to U.S. Provisional Application No. 62/308,216, filed on Mar. 15, 2016, all of which are hereby expressly incorporated by reference into the present application.

TECHNICAL FIELD

The present invention relates to a wireless communication system and, more particularly, to a method for estimating the index of a symbol using a synchronization signal and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

It may be difficult for a terminal to detect a synchronization signal (e.g., primary synchronization signal (PSS)/secondary synchronization signal (SSS)) or a broadcast channel (e.g., physical broadcast channel (PBCH)), etc. for all of beams present within a specific time unit. In this case, there is a problem in that information about the index of an OFDM symbol for the specific time unit and/or the boundary of the specific time unit may not be obtained.

In order to solve the above problem, this specification proposes a method of acquiring information about the index of a symbol and/or the boundary of a specific time unit received using a synchronization signal.

More specifically, this specification proposes a method of acquiring the information through a hopping pattern configured using the position of a frequency resource to which an SSS and/or a PSS is mapped.

Furthermore, this specification proposes a method of acquiring the information through a pattern configured using a physical layer cell identity (PCI) group index assigned to an SSS.

Furthermore, this specification proposes a method of acquiring the information through a pattern configured using SSS sequences differently configured depending on a deployment method of a secondary synchronization code (SSC).

Technical objects to be achieved by the present invention are not limited to the aforementioned technical objects, and other technical objects not described above may be evidently understood by a person having ordinary skill in the art to which the present invention pertains from the following description.

Technical Solution

A method of estimating the index of a symbol in a wireless communication system according to an embodiment of the present invention is performed by a user equipment, and includes processes of receiving, from a base station (i.e. eNB), one or more specific synchronization signals through one or more symbols, identifying indices corresponding to the one or more symbols based on a predefined pattern configured with multiple (or a plurality of) specific synchronization signals for a specific time unit and the received one or more specific synchronization signals, and receiving, from the base station, a specific signal through a specific symbol determined using the identified indices.

Furthermore, preferably, the predefined pattern may be configured using at least one of a pattern defined based on the position of a frequency resource in which each of the multiple specific synchronization signals is mapped in a symbol, a pattern defined based on indices related to a physical cell identity assigned to the multiple specific synchronization signals, and a pattern defined based on sequences generating the multiple specific synchronization signals.

Furthermore, preferably, the predefined pattern may include a first partial pattern for a first partial time unit and a second partial pattern for the second partial time unit, and the first partial pattern and the second partial pattern may be respectively represented by different information.

Furthermore, preferably, the process of identifying the indices corresponding to the one or more symbols may include processes of generating a specific pattern using the received one or more specific synchronization signals and identifying the indices of symbols in which the one or more specific synchronization signals are respectively received, by comparing the generated specific pattern with the predefined pattern.

Furthermore, preferably, the specific pattern may be generated based on information indicating the position of the frequency resource in which each of the one or more specific synchronization signals is mapped in the symbol, specific index information assigned to the one or more specific synchronization signals or sequence information generating the one or more specific synchronization signals.

Furthermore, preferably, each of the one or more specific synchronization signals and the multiple specific synchronization signals may include at least one secondary synchronization signal (SSS). The position of the frequency resource may be determined based on a difference between the position of a primary synchronization signal (PSS) and the position of the SSS mapped to each symbol in a frequency domain.

Furthermore, preferably, each of the one or more specific synchronization signals and the multiple specific synchronization signals may include each at least one SSS. The indices related to the physical cell identity may include physical layer cell identity group indices assigned to respective SSSs.

Furthermore, preferably, the method may further include a process of acquiring information for the boundary of the specific time unit based on the identified indices.

A user equipment estimating the index of a symbol in a wireless communication system according to another embodiment of the present invention includes a transceiver for transmitting and receiving radio signals and a processor functionally connected to the transceiver. The processor controls to receive, from a base station, one or more specific synchronization signals through one or more symbols, identify indices corresponding to the one or more symbols based on a predefined pattern configured with multiple specific synchronization signals for a specific time unit and the received one or more specific synchronization signals, and receive, from the base station, a specific signal through a specific symbol determined using the identified indices.

Furthermore, preferably, the predefined pattern may be configured using at least one of a pattern defined based on the position of a frequency resource in which each of the multiple specific synchronization signals is mapped in a symbol, a pattern defined based on indices related to a physical cell identity assigned to the multiple specific synchronization signals, and a pattern defined based on sequences generating the multiple specific synchronization signals.

Furthermore, preferably, the predefined pattern may include a first partial pattern for a first partial time unit and a second partial pattern for the second partial time unit, and the first partial pattern and the second partial pattern may be respectively represented by different information.

Furthermore, preferably, the processor may control to generate a specific pattern using the received one or more specific synchronization signals and to identify indices of symbols in which the one or more specific synchronization signals are respectively received, by comparing the generated specific pattern with the predefined pattern.

Furthermore, preferably, the specific pattern may be generated based on information indicating the position of the frequency resource in which each of the one or more specific synchronization signals is mapped in the symbol, specific index information assigned to the one or more specific synchronization signals or sequence information generating the one or more specific synchronization signals.

Furthermore, preferably, each of the one or more specific synchronization signals and the multiple specific synchronization signals may include at least one secondary synchronization signal (SSS). The position of the frequency resource may be determined based on a difference between the position of a primary synchronization signal (PSS) and the position of the SSS mapped to each symbol in a frequency domain.

Furthermore, preferably, each of the one or more specific synchronization signals and the multiple specific synchronization signals may include each at least one SSS. The indices related to the physical cell identity may include physical layer cell identity group indices assigned to respective SSSs.

Advantageous Effects

According to the embodiment of the present invention, although a synchronization signal is not detected within some symbols included in a specific time unit (e.g., subframe), information about the index of a symbol and/or the boundary of a specific time unit detected using a predefined pattern can be obtained.

Furthermore, in the present invention, since a pattern consisting of an existing defined synchronization signal (e.g., PSS or SSS) is used, a separate synchronization signal for indicating the index of a symbol and/or the boundary of a specific time unit does not need to be defined.

Accordingly, the occurrence of additional overhead for the detection of a synchronization signal can be prevented.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 10 illustrates examples of a PCI group index pattern of a full time unit and PCI group index patterns of partial time units to which the present invention may be applied.

MODE FOR INVENTION

Figure 1:
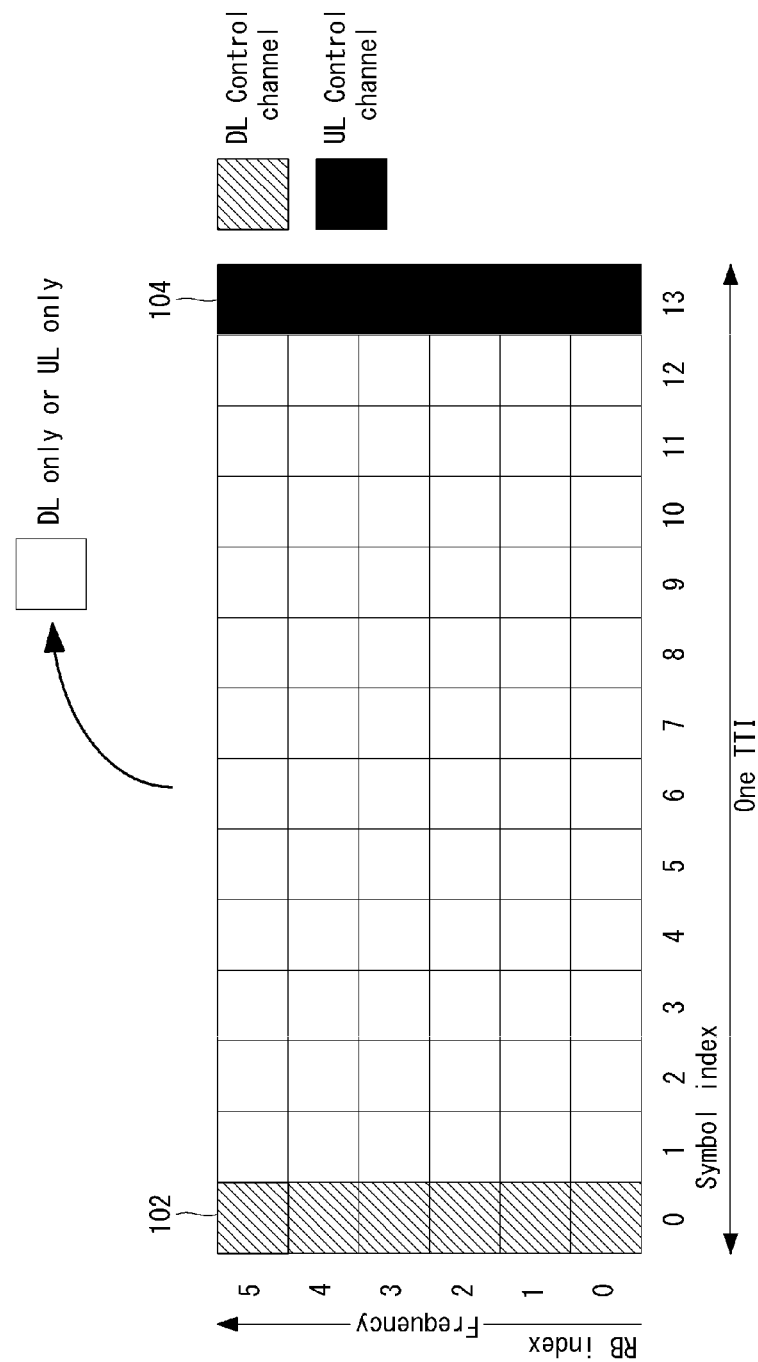
FIG. 1 illustrates an example of a self-contained subframe structure to which the present invention may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document. 3GPP LTE/LTE-A is primarily described for clear description, but technical features of the present invention are not limited thereto.

As the supply of smartphones and Internet of Things (IoT) UEs is rapidly spread, the amount of information exchanged over a communication network is explosively increased. Accordingly, in a next-generation radio access technology, an environment (e.g., enhanced mobile broadband communication) that provides users with faster services than the existing communication system (or existing radio access technology) may need to be taken into consideration. To this end, the design of a communication system in which machine type communication (MTC) providing services by connecting multiple devices and objects is also taken into consideration.

Furthermore, the design of a communication system (e.g., ultra-reliable and low latency communication URLLC) in which reliability of communication and/or service and/or a terminal, etc. sensitive to latency is taken into consideration is also discussed. In the following specification, for convenience of description, a next-generation radio access technology is referred to as a new RAT (NR, radio access technology). A wireless communication system to which the NR is applied is referred to as an NR system.

Self-Contained Subframe Structure

A time division duplexing (TDD) structure considered in an NR system is a structure in which both uplink (UL) and downlink (DL) are processed in one subframe. This is for minimizing latency of data transmission in the TDD system, and the structure is called a self-contained subframe structure.

FIG. 1 illustrates an example of a self-contained subframe structure to which the present invention may be applied. FIG. 1 is only for convenience of description and does not limit the scope of the present invention.

Referring to FIG. 1, as in the case of legacy LTE, a case where one subframe includes 14 orthogonal frequency division multiplexing (OFDM) symbols is assumed. In FIG. 1, a region 102 means a downlink control region, and a region 104 means an uplink control region. Furthermore, a region (i.e., region not having separate indication) other than the region 102 and the region 104 may be used for the transmission of downlink data or uplink data.

That is, uplink control information and downlink control information are transmitted in one self-contained subframe. In contrast, in the case of data, uplink data or downlink data is transmitted in one self-contained subframe. If the structure shown in FIG. 1 is used, downlink transmission and uplink transmission are sequentially performed and the transmission of downlink data and the reception of uplink ACK/

NACK may be performed within one self-contained subframe. As a result, when an error in data transmission occurs, the time taken up to the retransmission of data can be reduced. Accordingly, latency related to data delivery can be minimized.

In a self-contained subframe structure such as FIG. 1, there is a need for a time gap for a process for an eNodeB (eNB) and/or a terminal (user equipment (UE)) to switch from a transmission mode to a reception mode or from the reception mode to the transmission mode. In relation to the time gap, if uplink transmission is performed after downlink transmission in the self-contained subframe, some OFDM symbol(s) may be configured as a guard period (GP).

Analog Beamforming

In a mmWave (mmW) communication system, a number of (or multiple) antennas may be installed in the same area as the wavelength of a signal is shortened. That is, in a 30 CHz band, if a wavelength is about 1 cm and antennas are installed at a 0.5 lambda interval in a 2-dimension array form in a panel of 5 cm×5 cm, a total of 100 antenna elements may be installed. Accordingly, in the mmWave communication system, a scheme for increasing coverage or increasing throughput by increasing a beamforming (BF) gain using multiple antenna elements may be taken into consideration.

In this case, if a transceiver unit (TXRU) is installed to enable transmission power and phase control for each antenna element, independent beamforming is possible for each frequency resource. In this case, a scheme for installing the TXRU in all of the antenna elements (e.g., 100 antenna elements) may be low in effectiveness. Accordingly, a method of mapping multiple antenna elements to one TXRU and controlling the direction of a beam using an analog phase rotationer may be taken into consideration.

The aforementioned analog beamforming method has a problem in that it cannot perform a frequency selective beam operation because it can generate only one beam direction in a full band. Accordingly, hybrid beamforming having B TXRUs having a smaller number than Q antenna elements may be taken into consideration as the middle form of digital beamforming and analog beamforming. In this case, there is a difference depending on a method of connecting the B TXRUs and the Q antenna elements, but the number of directions of a beam capable of transmitting signals at the same time may be restricted to B or less.

In the legacy LTE system, a primary synchronization signal (PSS)/secondary synchronization signal (SSS) is transmitted omni-directionally (or amnidirectionally). In contrast, in the case of an NR system, the signal of a PSS/SSS/physical broadcast channel (PBCH), etc. transmitted by an eNB may be beamformed and transmitted. Accordingly, a method of transmitting the signal by performing beamforming on the signal while omnidirectionally turning a beam direction supported by the eNB may be taken into consideration.

The transmission method may be called beam scanning. If an eNB supports a maximum of N beam directions, the eNB may transmit the signal of a PSS/SSS/PBCH, etc. with respect to N directions. That is, the eNB may transmit the synchronization signals of a PSS/SSS/PBCH, etc. with respect to each direction while sweeping all the directions supported by the eNB. A minimum transmission unit in which one beam is transmitted may be one symbol on a time domain. A transmission time when an eNB completes beam scanning may be determined based on one time unit. The time unit includes one or more symbols and may be expressed in a slot, subframe or multiple subframe form.

For example, if N beams are present in a time unit consisting of N symbols, an eNB may perform beam scanning using one symbol allocated thereto with respect to one beam. For another example, if the number of beams is N/M, an eNB performs sweeping in N/M directions using M symbols allocated thereto with respect to each beam. Accordingly, the eNB may transmit the synchronization signals of a PSS/SSS/PBCH, etc. for each beam. In this case, each of the beams may be mapped in a symbol unit.

If multiple beams are configured within one time unit as described above, it may be difficult for a UE to detect a PSS/SSS/PBCH, etc. for all of beams present within the one time unit. In this case, the UE may not acquire information about an OFDM symbol index and/or time unit boundary necessary for a next operation because it cannot scan a full time unit. Accordingly, a method for acquiring information about an OFDM symbol index and/or a time unit boundary using information of some time units may need to be taken into consideration.

Hereinafter, in an initial access process of an NR system, a method for acquiring information about an OFDM symbol index and/or time unit boundary within a time unit consisting of two or more symbols using a PSS and an SSS is described.

Specifically, this specification provides (1) a method using an SSS hopping pattern, (2) a method using an SSS physical layer cell identity (PCI) group index pattern, (3) a method using a secondary synchronization code (SSC) mapping type pattern, and (4) a method of combining and using the methods in order to acquire information about an OFDM symbol index and/or a time unit boundary.

In this case, a time unit may include a subframe, multiple subframes or multiple symbols smaller than a subframe. Furthermore, in this specification, a system using OFDM is described as an example, for convenience of description, but the method may be used to acquire a symbol index even in other system(s) using a synchronization stage, such as a PSS/SSS.

Furthermore, a wireless device, transmitter, receiver or transceiver used in this specification means a device capable of performing at least one of the transmission of a signal and the reception of a signal, and may include a UE, an eNB, etc. Furthermore, the wireless device supports an NR system and may also additionally support a legacy LTE system.

Furthermore, hereinafter, embodiments have been divided, for convenience of description, and they may be combined and practiced or independently practiced.

(1) Method Using SSS Hopping Pattern (First Embodiment)

A pattern may be configured depending on the position of a frequency resource to which an SSS is mapped within a time unit consisting of a group of multiple symbols (i.e., multiple OFDM symbols). The indices of symbols detected through the pattern may be identified. The time unit may consist of a subframe, multiple subframes greater than the subframe or multiple symbols of a smaller unit than the subframe. Furthermore, the frequency resource used for the pattern may consist of a resource block (RB) unit or a frequency unit including at least one subcarrier. Hereinafter, it is assumed that the unit of a frequency resource for frequency hopping is an RB unit, for convenience of description.

An SSS hopping pattern may be expressed depending on a relative position between an SSS and a PSS in a frequency domain. First, a reception node (e.g., UE) estimates the timing of each symbol and a frequency domain through the detection of a PSS. Thereafter, the reception node may detect an SSS hopping position by tracking an SSS at an available frequency resource position with respect to (or for) each symbol based on the position of the PSS. When the SSS hopping positions of all of detected symbols are determined, the reception node may estimate an SSS hopping pattern by combining the determined SSS hopping positions.

Figure 2:
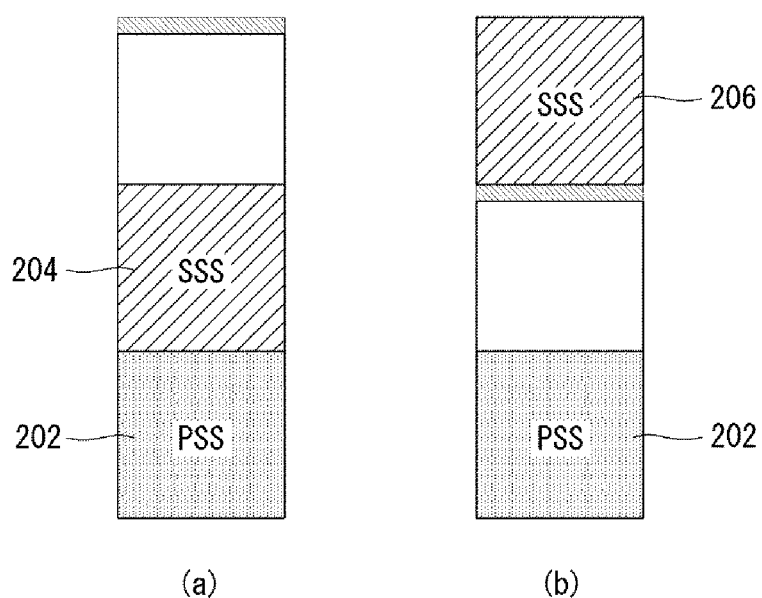
FIG. 2 illustrates examples of constituent elements of a second synchronization signal (SSS) hopping pattern to which the present invention may be applied.

FIG. 2 illustrates examples of constituent elements of a second synchronization signal (SSS) hopping pattern to which the present invention may be applied. FIG. 2 is only for convenience of description and does not limit the scope of the present invention.

Referring to FIG. 2, a case where a PSS and SSS are transmitted in one symbol (symbol based on a time axis) is assumed. Furthermore, a region 202 may mean an RB in which the PSS is transmitted. A region 204 and a region 206 may mean RBs in which respective SSSs are transmitted.

FIG. 2(a) illustrates the deployment of a case where the SSS is transmitted in the region 204, that is, a first RB, on the basis of the region 202. In contrast, FIG. 2(b) illustrates the deployment of a case where the SSS is transmitted in the region 206, that is, a second RB, on the basis of the region 202. If a deployment, such as FIG. 2(a), is expressed as "0" and a deployment, such as FIG. 2(b), is expressed as "1", a pattern of a sequence form expressed as "0" and "1" may be configured. The index of each symbol may be estimated through the pattern. In the case of FIG. 2, information is identified using two SSS hopping positions, for convenience of description, but an SSS hopping pattern may be configured using two or more SSS hopping positions.

An SSS hopping pattern acquired based on the aforementioned SSS hopping position and information of a symbol index within a time unit may be used to find out (or estimate) the boundary of the time unit. In this case, in order to estimate the information of the symbol index and/or the boundary of the time unit, a reception node may use information (e.g., a pattern of a length 14) about an SSS hopping pattern previously shared between a transmission node (e.g., eNB) and the reception node (e.g., UE) or previously defined in a system. More specifically, the reception node may determine a symbol index within a time unit and the boundary of the time unit through a comparison between information about the existing known SSS hopping pattern and an SSS hopping pattern acquired based on an SSS hopping position.

For example, the aforementioned method may be applied by assuming a subframe in which multiple symbols are present to be one time unit. In this case, the starting point and ending point of the subframe may be identified (or determined) through the index of a symbol and an SSS hopping pattern. If the time unit of a subframe unit in which 14 symbols are present is taken into consideration, a method using an SSS hopping pattern may be used as in FIG. 3.

Figure 3:
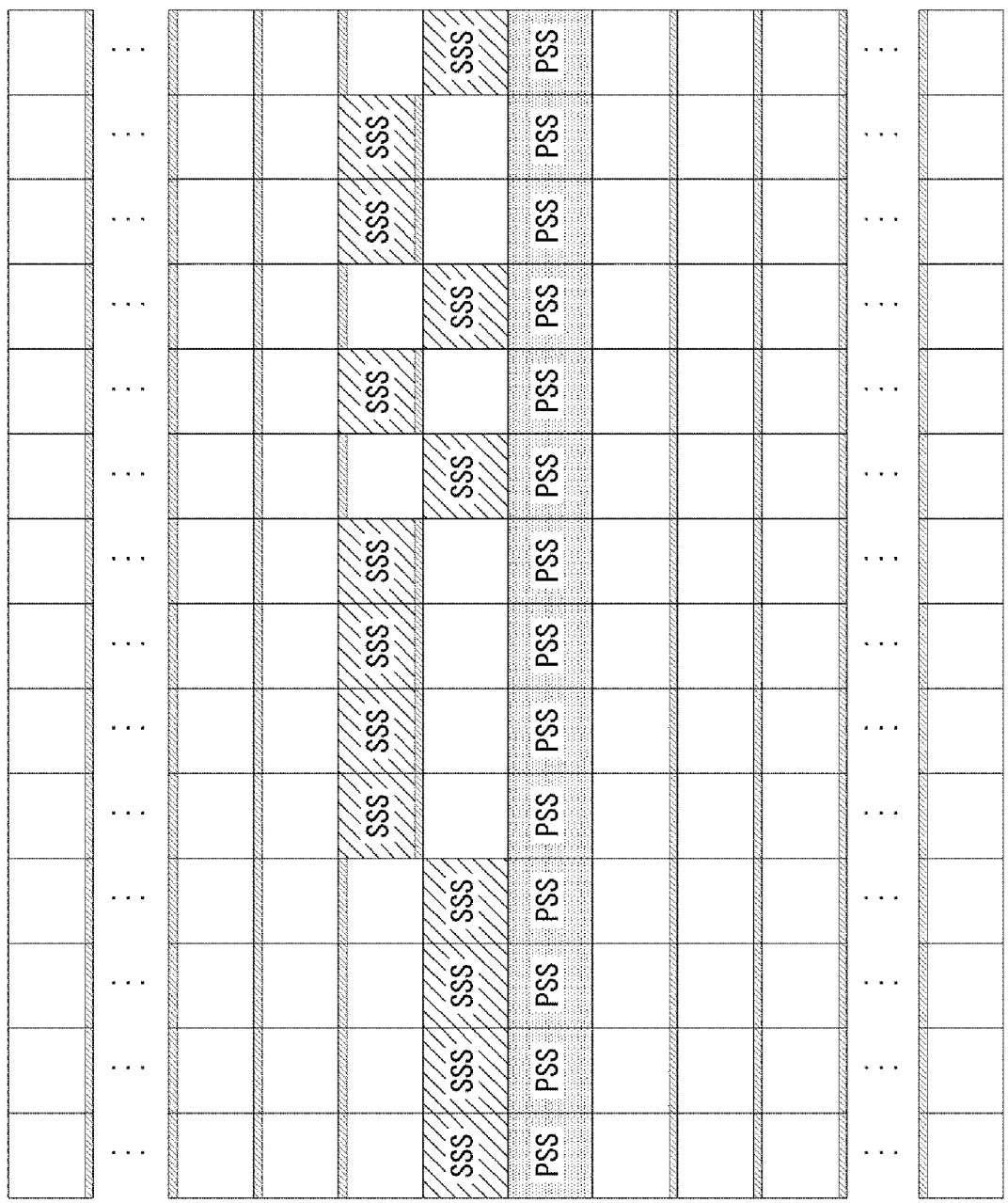
FIG. 3 illustrates an example of an SSS hopping pattern configured using SSS hopping positions to which the present invention may be applied.

FIG. 3 illustrates an example of an SSS hopping pattern configured using SSS hopping positions to which the present invention may be applied. FIG. 3 is only for convenience of description and does not limit the scope of the present invention.

Referring to FIG. 3, a case where a time unit includes a subframe unit in which 14 symbols are present is assumed. Furthermore, a case where an SSS hopping pattern is configured using the SSS deployments (or constituent elements) shown in FIG. 2 is assumed.

In the case of FIG. 3, as the deployment of FIG. 2(a) is expressed as "0" and the deployment of FIG. 2(b) is expressed as "1", the SSS hopping pattern may be expressed as the same sequence as [0 0 0 0 1 1 1 1 0 1 0 1 1 0]. If a reception node identifies the SSS hopping pattern through the detection of an SSS, it may determine the starting point and ending point of the pattern to be the boundary of a subframe.

In this case, the sequence that may be used in the SSS hopping pattern may be designed by taking into consideration a correlation property in order to meet accurate synchronization (sync). For example, if two SSS hopping positions are used, the SSS hopping pattern may be configured using a bit-sequence having a good correlation property, such as a pseudo-noise (PN) sequence and/or a gold sequence.

Furthermore, an SSS hopping pattern may be designed to acquire information about a symbol index and/or a time unit boundary (e.g., subframe unit boundary) although the detection of some symbols has failed. To this end, the SSS hopping pattern may be designed in a form, such as a random sequence, not a form in which a specific pattern is repeated.

For example, if a reception node fails in detecting the last 4 symbols and thus acquires a [0 0 0 0 1 1 1 1 0 1] pattern of a length 10, the reception node may compare the acquired pattern with an already known pattern of a length 14 (i.e., previously shared between a transmission node and the reception node or previously defined in a system). The reception node may estimate the positions of lost symbols (or the positions of the four symbols whose detection has failed) and/or the boundary of a time unit (e.g., the boundary of a subframe) through the comparison. Furthermore, in order to improve the detection performance of an SSS hopping pattern, a method of increasing the number of cases where the positions of frequency resources may be hopped (i.e., hopping positions) may be taken into consideration.

The entire length of a pattern (i.e., SSS hopping pattern) configured for the aforementioned one time unit may be used with respect to one beam. Furthermore, the pattern configured for the aforementioned one time unit may be split and used in order to support partial time units divided into multiple intervals. In this case, although a reception node detects (or observes) only the partial time unit, an SSS hopping pattern needs to be designed so that the boundary of the entire or full time unit is acquired. To this end, the SSS hopping pattern may be designed so that the patterns of partial time units according to a size to be split can be identified.

Figure 4:
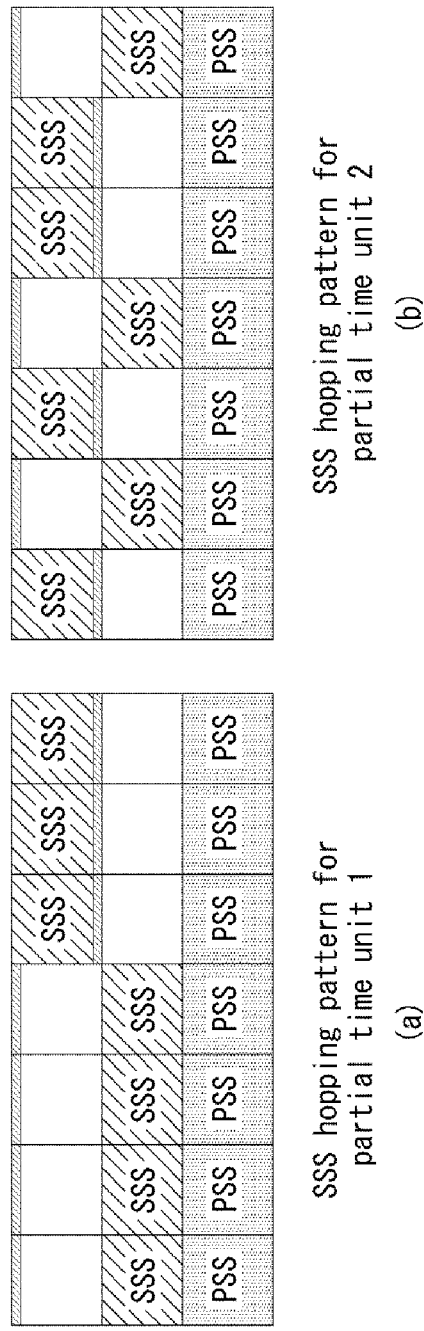
FIG. 4 illustrates examples of patterns of partial time units split from a pattern of a full time unit to which the present invention may be applied.

For example, if the case (e.g., a subframe consisting of 14 symbols) of FIG. 3 is taken into consideration, as in FIG. 4, the 7 symbols of a front part may be set as a partial time unit 1, and the 7 symbols of a rear part may be set as a partial time unit 2. In this case, the partial time unit 1 and the partial time unit 2 may be applied to different beams. In this case, SSS hopping patterns for the respective partial time units may be differently expressed and identified.

FIG. 4 illustrates examples of patterns of partial time units split from a pattern of a full time unit to which the present invention may be applied. FIG. 4 is only for convenience of description and does not limit the scope of the present invention.

Referring to FIG. 4, a case where one time unit includes 14 symbols and each of partial time units (first partial time unit and second partial time unit) includes 7 symbols is assumed. In this case, SSS hopping patterns forming the respective partial time units may be differently expressed and identified.

For example, FIG. 4(a) illustrates a first partial time unit. A partial SSS hopping pattern for a corresponding partial time unit may be expressed as [0 0 0 1 1 1]. In contrast, FIG. 4(b) illustrates a second partial time unit. A partial SSS hopping pattern for a corresponding partial time unit may be expressed as [1 0 1 0 1 1 0].

In this case, a reception node may receive SSSs corresponding to each partial time unit and may detect (or identify) each partial SSS hopping pattern. The reception node may acquire information about the indices of received symbols and/or the boundary of the partial time unit using the detected partial SSS hopping pattern, and may also estimate the boundary of a full time unit based on the information.

Furthermore, in a system using a narrow beam, if different beams are allocated to all of symbols, different frequency resources may be allocated to the SSSs of the symbols (i.e., if all of the SSSs are transmitted in different frequency positions), the SSSs may be identified through the different frequency resources. In this case, identification based on a pattern cannot be guaranteed because it is difficult for a reception node to detect (or observe) a pattern by receiving multiple symbols. Instead, symbol indices may be identified through frequency resources differently allocated to symbols according to a predetermined rule, and a time unit boundary may be estimated.

Furthermore, an SSS hopping pattern may be designed (or configured) to acquire information about a symbol index and the boundary of a time unit although the detection of some of all of symbols has failed by taking into consideration both the hopping pattern of a full time unit length and a hopping pattern supporting a partial time unit. In this case, a method of forming a partial time unit may be various. For example, in the case of a system in which one subframe includes 14 symbols, the system may be designed to support a method of dividing the 14 symbols into 2 partial time units, each one having 7 symbols, and using the 2 partial time units and a method of dividing the 14 symbols into 7 partial time units, each one having 2 symbols, and using the 7 partial time units at the same time.

Figure 5:
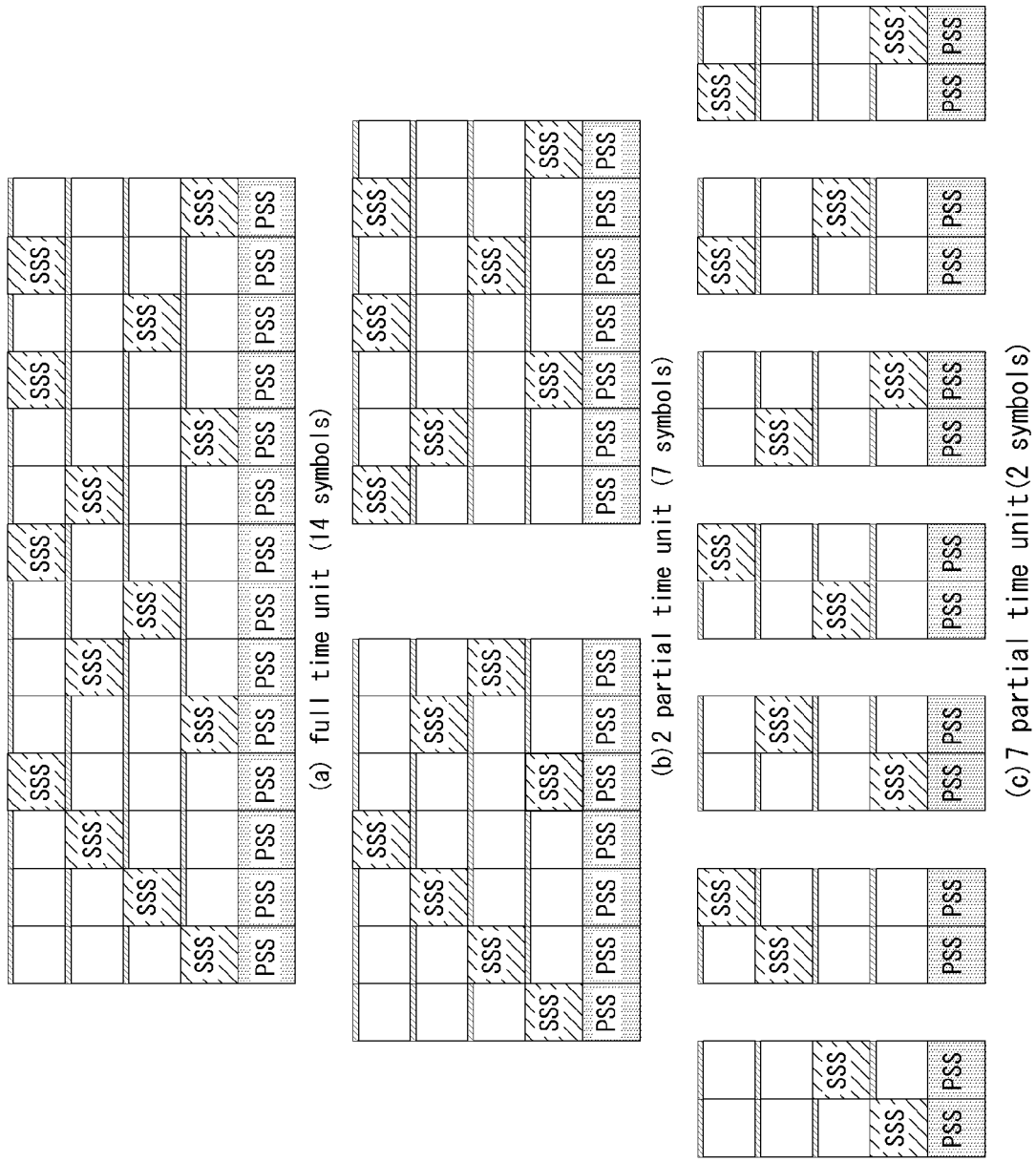
FIG. 5 illustrates examples of a hopping pattern of a full time unit and hopping patterns of partial time units to which the present invention may be applied.

FIG. 5 illustrates examples of a hopping pattern of a full time unit and hopping patterns of partial time units to which the present invention may be applied. FIG. 5 is only for convenience of description and does not limit the scope of the present invention.

Referring to FIG. 5, a case where a full time unit is set as a subframe consisting of 14 symbols is assumed. A case where 4 RBs are used for an SSS hopping pattern, that is, a case where 4 hopping positions are supported, is assumed. In this case, as in the case of FIG. 2, information indicated by SSS deployments (i.e., SSS deployments according to hopping positions) may be "0", "1", "2", and "3."

FIG. 5(a) illustrates an SSS hopping pattern for a full time unit. The SSS hopping pattern shown in FIG. 5(a) may be expressed as [0 1 2 3 0 2 1 3 2 0 3 1 3 0]. Furthermore, FIG. 5(b) illustrates SSS hopping patterns for respective two partial time units, each one including 7 symbols. The SSS hopping patterns shown in FIG. 5(b) may be expressed as [0 1 2 3 0 2 1] and [3 2 0 3 1 3 0], respectively. Furthermore, FIG. 5(c) illustrates SSS hopping patterns for 7 partial time units, each one having 2 symbols. The SSS hopping patterns shown in FIG. 5(c) may be expressed as [0 1], [2 3], [0 2], [1 3], [2 0], [3 1], and [3 0], respectively. The split SSS hopping patterns may be expressed in different sequence forms and may be configured to be identified mutually.

Furthermore, a method of setting multiple time units as a time unit set and using one long SSS hopping pattern by combining the SSS hopping patterns of the time units may also be taken into consideration. A method of configuring the time unit set may be applied to a case where time units are contiguously deployed in a time domain or a case where time units are distributed and deployed at specific times. An SSS hopping pattern configured through the method may be used to estimate each symbol index and may also be used to acquire information about the boundary of each time unit and/or the boundary of a time unit set.

Furthermore, if multiple SSSs are used in one symbol, a method of designing a new SSS hopping pattern through a combination of the hopping patterns of SSSs may also be taken into consideration. If multiple SSSs are present within one symbol, the SSSs may be set to have the same value or may be set to have different values. If all of SSSs are set to have the same value, information for acquiring information about a symbol index and a time unit boundary may be given as only a hopping pattern including the SSSs.

In contrast, if all of SSSs are set to have different values, information for acquiring information about a symbol index and a time unit boundary may be given based on information of a value expressed by each SSS in addition to a hopping pattern including SSSs. In this case, if SSSs have different values, each SSS may be identified based on information according to a method of deploying a physical layer cell identity (PCI) group index or a secondary synchronization code 1 (SSC1)/secondary synchronization code 2 (SSC2). The method may be compliant with methods described in a part related to the second embodiment and third embodiment of this specification.

Figure 6:
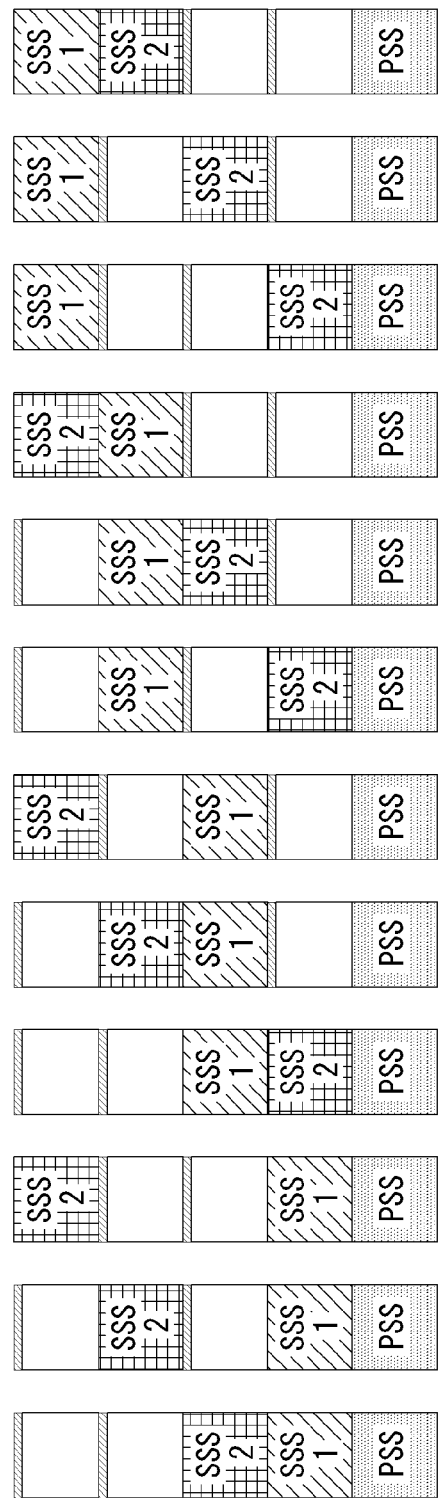
FIG. 6 illustrates an example of constituent elements of an SSS hopping pattern if multiple SSSs are used in one symbol to which the present invention may be applied.

FIG. 6 illustrates an example of constituent elements of an SSS hopping pattern if multiple SSSs are used in one symbol to which the present invention may be applied. FIG. 6 is only for convenience of description and does not limit the scope of the present invention.

Referring to FIG. 6, a case where 2 SSSs are transmitted in one symbol and the two SSSs have different values is assumed. Furthermore, in FIG. 6, each SSS is transmitted in a different hopping position of 4 available hopping positions. In this case, each constituent element may be used to express different information depending on the deployment of each SSS.

Furthermore, a method of estimating a symbol index using an SSS hopping pattern and acquiring information about the boundary of a time unit may be applied to the case of a PSS. In this case, the position of the PSS is defined as a relative position for PSSs located in different symbols present within the same time unit. In this case, the relative position means a relative position in a frequency domain. A method using a PSS hopping pattern may be independently used and may be combined with the aforementioned method using an SSS hopping pattern and used. In the case of the method of combining and using a PSS hopping pattern and an SSS hopping pattern, after the hopping pattern of a PSS is first detected, an SSS hopping pattern may be determined through a relative position for the PSS position of each symbol.

(2) Method Using SSS Physical Layer Cell Identity Group Index (Second Embodiment)

A method of using the PCI group index of an SSS in order to estimate a symbol index and/or the boundary of a time unit within the time unit consisting of a group of multiple symbols may be taken into consideration. The method may mean a method of forming a pattern through a rule in which an SSS PCI group index (i.e., a PCI group index for an SSS) is allocated within one time unit and estimating the indices of symbols detected through the formed pattern and/or the boundary of the time unit. In this case, the position of the SSS is determined by a predefined rule, and the frequency domain positions of SSSs in all symbols may be the same or different. In this case, the time unit may consist of a subframe, multiple subframes greater than the subframe, or multiple symbols of a smaller unit than the subframe. Furthermore, in this case, the PCI group index is for identifying the identity of a physical cell, and means an index indicating a group including the identities of one or more physical cells.

An SSS PCI group index pattern may be configured through the identification of two or more SSS PCI group indices. For example, if two SSS PCI group indices are used, two forms in which information may be identified may be present.

Figure 7:
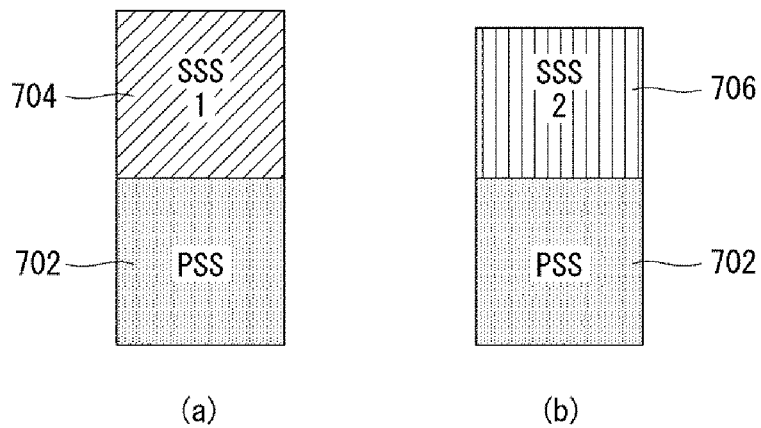
FIG. 7 illustrates examples of constituent elements of an SSS physical layer cell identity (PCI) group index pattern to which the present invention may be applied.

FIG. 7 illustrates examples of constituent elements of an SSS physical layer cell identity (PCI) group index pattern to which the present invention may be applied. FIG. 7 is only for convenience of description and does not limit the scope of the present invention.

Referring to FIG. 7, a case where each of an SSS1 and SSS2 is transmitted in one symbol (symbol based on a time axis) along with a PSS is assumed. A region 702 means a region in which the PSS is transmitted, a region 704 means a region in which the SSS1 is transmitted, and a region 706 means a region in which the SSS2 is transmitted. Furthermore, the region 704 and the region 706 may be determined according to a predefined rule.

FIG. 7(a) may be expressed as "0" as a constituent element in which the SSS1 is transmitted. Furthermore, FIG. 7(b) may be expressed as "1" as a constituent element in which the SSS2 is transmitted. In this case, the SSS1 may mean an SSS to which a first PCI group index is allocated, and the SSS2 may mean an SSS to which a second PCI group index is allocated. An SSS PCI group index pattern may be expressed as a sequence form consisting of "0" and "1" using the constituent elements.

In this case, a reception node (e.g., UE) may estimate an SSS PCI group index pattern through a comparison between SSS PCI group indices at the position of each frequency resource to which the SSS may be allocated. The reception node may identify a symbol index within a time unit for each detected symbol through the estimated SSS mapping type index pattern. In the case of FIG. 7, examples including two SSS PCI group indices have been illustrated, for convenience of description, but an SSS PCI group index pattern may be configured using two or more SSS PCI group indices.

An SSS PCI group index pattern estimated through the aforementioned procedure and information of a symbol index within a time unit may be used to find out (or estimate) the boundary of the time unit. In this case, a reception node may estimate a symbol index through a previously agreed (or defined) SSS PCI group index pattern, and may acquire information about the boundary of a time unit. In other words, in order to estimate information of the symbol index and/or the boundary of the time unit, the reception node may use information (e.g., a pattern of a length 14) about an SSS PCI group index pattern previously shared between a transmission node (e.g., eNB) and the reception node (e.g., UE) or previously defined in a system. More specifically, the reception node may determine a symbol index within a time unit and the boundary of the time unit through a comparison between information about the existing known SSS PCI group index pattern and an estimated SSS PCI group index pattern.

For example, the aforementioned method is applied, assuming that a subframe in which multiple symbols are present is one time unit. In this case, the starting point and ending point of a subframe may be identified (or determined) through the index of a symbol and an SSS PCI group index pattern. If the time unit of a subframe unit in which 14 symbols are present is taken into consideration, a method using an SSS PCI group index pattern may be used as in FIG. 8.

Figure 8:
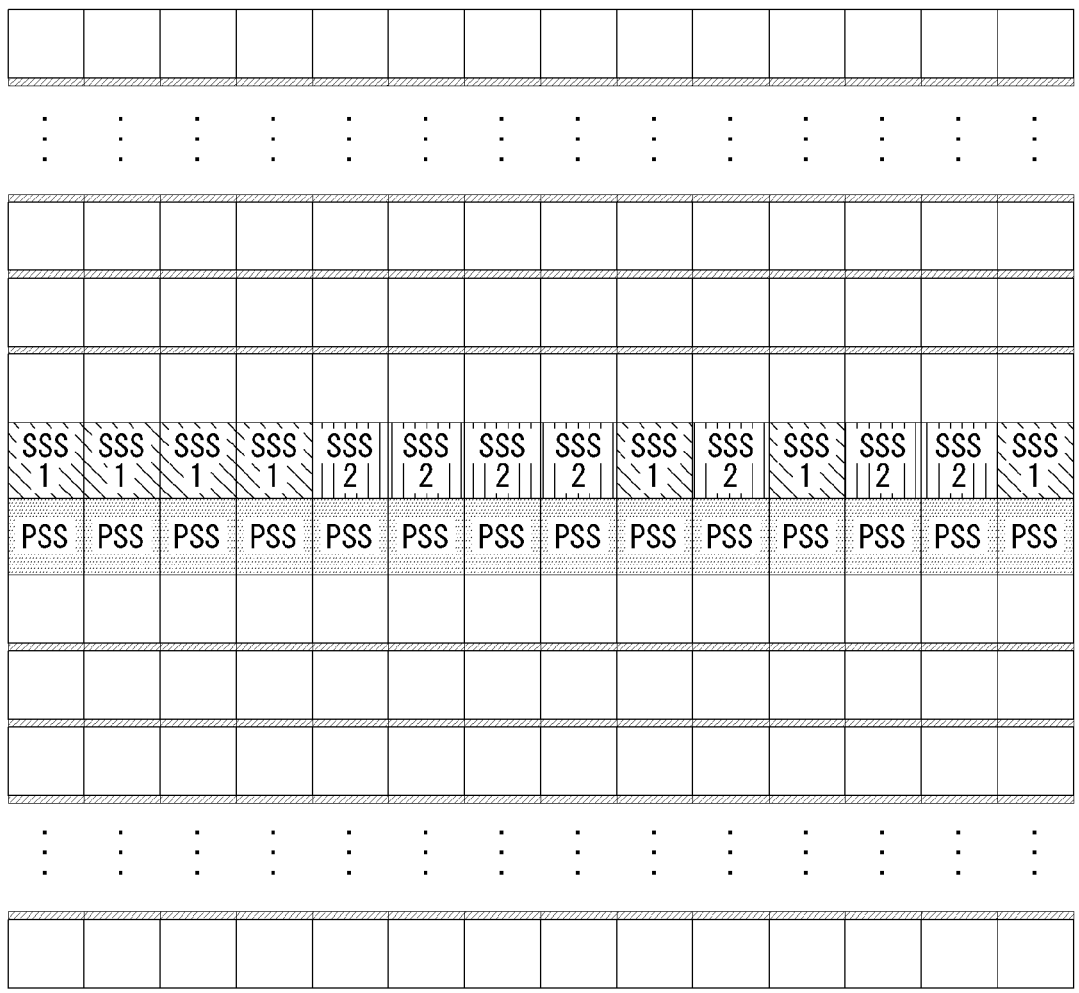
FIG. 8 illustrates examples of an SSS PCI group index pattern configured using SSS PCI group indices to which the present invention may be applied.

FIG. 8 illustrates examples of an SSS PCI group index pattern configured using SSS PCI group indices to which the present invention may be applied. FIG. 8 is only for convenience of description and does not limit the scope of the present invention.

Referring to FIG. 8, a case where a time unit consists of a subframe unit in which 14 symbols are present is assumed. Furthermore, a case where an SSS PCI group index pattern is configured using the constituent elements of FIG. 7 is assumed.

In the case of FIG. 8, as the deployment of FIG. 7(a) is expressed as "0" and the deployment of FIG. 7(b) is expressed as "1", an SSS PCI group index pattern may be expressed as the same sequence as [0 0 0 0 1 1 1 1 0 1 0 1 1 0]. If a reception node identifies (detects or estimates) an SSS PCI group index pattern through the detection of an SSS, it may determine the starting point and ending point of the pattern as the boundary of a subframe. In this case, as in the first embodiment (SSS hopping pattern), in order to perform accurate synchronization, the SSS PCI group index pattern may be configured using a bit-sequence having a good correlation property.

Furthermore, although the detection of some symbols has failed, the SSS PCI group index pattern may be designed to acquire information about a symbol index and/or a time unit boundary (e.g., subframe unit boundary). To this end, the SSS PCI group index pattern may be designed in a form, such as a random sequence, not a form in which a specific pattern is repeated.

For example, if a reception node has failed in detecting the last 4 symbols and acquires (estimates or detects) a [0 0 0 0 1 1 1 1 0 1] pattern of a length 10, the reception node may compare the acquired pattern with an already known pattern of a length 14 (i.e., previously shared between a transmission node and the reception node or previously defined in a system). The reception node may estimate the positions of lost symbols (or the positions of the four symbols whose detection has failed) and/or the boundary of a time unit (e.g., the boundary of a subframe) through the comparison. Furthermore, in order to improve detection performance of the SSS PCI group index pattern, a method of increasing the number of cases of selectable PCI group indices may also be taken into consideration.

The entire length of a pattern (i.e., SSS PCI group index pattern) configured for the aforementioned one time unit may be used for one beam. Furthermore, the pattern configured for the aforementioned one time unit may be split and used in order to support partial time units divided into multiple intervals. In this case, although a reception node detects (or observes) only the partial time unit, the SSS PCI group index pattern needs to be designed so that the reception node can acquire the boundary of the entire or full time unit. To this end, the SSS PCI group index pattern may be designed so that the patterns of partial time units according to a size to be split can be identified.

Figure 9:
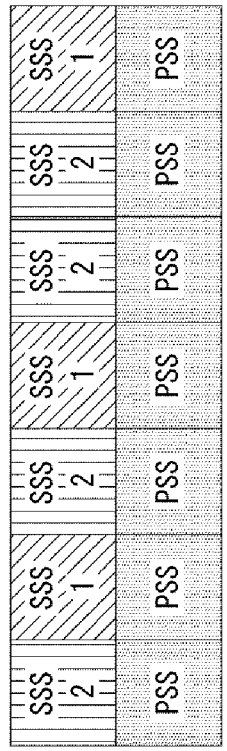
FIG. 9 illustrates examples of patterns of partial time units split from a pattern of a full time unit to which the present invention may be applied.
Figure 9:
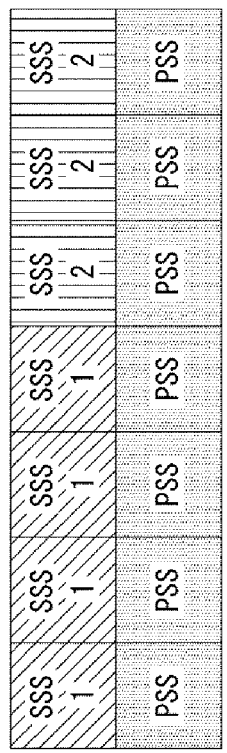

For example, if the case of FIG. 8 (e.g., a subframe consisting of 14 symbols) is considered, as in FIG. 9, the 7 symbols of a front part may be set as a partial time unit 1 and the 7 symbols of a rear part may be set as a partial time unit 2. In this case, the first partial time unit and the second partial time unit may be applied to different beams. In this case, SSS PCI group index patterns for the respective partial time units may be differently expressed and identified.

FIG. 9 illustrates examples of patterns of partial time units split from a pattern of a full time unit to which the present invention may be applied. FIG. 9 is only for convenience of description and does not limit the scope of the present invention.

Referring to FIG. 9, a case where one time unit includes 14 symbols and each of partial time units (first partial time unit and second partial time unit) includes 7 symbols is assumed. In this case, SSS PCI group index patterns forming the respective partial time units may be differently expressed and identified.

For example, FIG. 9(a) illustrates a first partial time unit, and a partial SSS PCI group index pattern for the corresponding partial time unit may be expressed as [0 0 0 0 1 1 1]. In contrast, FIG. 9(b) illustrates a second partial time unit, and a partial SSS PCI group index pattern for the corresponding partial time unit may be expressed as [1 0 1 0 1 1 0].

In this case, a reception node may receive SSSs corresponding to each partial time unit, and may detect (or identify) each partial SSS PCI group index pattern. The reception node may acquire information about the indices of received symbols and/or the boundary of the partial time unit using the detected partial SSS PCI group index pattern, and may estimate the boundary of a full time unit based on the information.

Furthermore, if different beams are allocated to all of symbols in a system using a narrow beam, different SSS PCI group indices may be allocated to the SSSs of each symbol. The SSSs may be identified through the different SSS PCI group indices. In this case, identification based on a pattern cannot be guaranteed because it is difficult for a reception node to detect (or observe) the pattern by receiving multiple symbols. Instead, symbol indices may be identified through SSS PCI group indices differently allocated to symbols according to a predetermined rule, and a time unit boundary may be estimated.

Furthermore, an SSS PCI group index pattern may be designed (or configured) to acquire information about a symbol index and the boundary of a time unit although the detection of some of all of symbols has failed by taking into consideration both a PCI group index pattern of a full time unit length and a PCI group index pattern that supports a partial time unit. In this case, a method of configuring the partial time unit may be various. For example, in the case of a system in which one subframe includes 14 symbols, the system may be designed to support a method of dividing the 14 symbols into 2 partial time units, each one having 7 symbols, and using the 2 partial time units and a method of dividing the 14 symbols into 7 partial time units, each one having 2 symbols, and use the 7 partial time units.

FIG. 10 illustrates examples of a PCI group index pattern of a full time unit and PCI group index patterns of partial time units to which the present invention may be applied. FIG. 10 is only for convenience of description and does not limit the scope of the present invention.

Referring to FIG. 10, a case where a full time unit is configured as a subframe consisting of 14 symbols is assumed. A case where 4 PCI group indices are used for an SSS PCI group index pattern, that is, a case where 4 constituent elements are supported, is assumed. In this case, as in the case of FIG. 7, information indicated by respective constituent elements may be "0", "1", "2", and "3."

FIG. 10(a) illustrates an SSS PCI group index pattern for a full time unit. The SSS PCI group index pattern shown in FIG. 10(a) may be expressed as [0 1 2 3 0 2 1 3 2 0 3 1 3 0]. Furthermore, FIG. 10(b) illustrates SSS PCI group index patterns for 2 partial time units, each one having 7 symbols, and the SSS PCI group index patterns may be expressed as [0 1 2 3 0 2 1] and [3 2 0 3 1 3 0], respectively. Furthermore, FIG. 10(c) illustrates SSS PCI group index patterns for 7 partial time units, each one having 2 symbols. The SSS PCI group index patterns may be expressed as [0 1], [2 3], [0 2], [1 3], [2 0], [3 1], and [3 0], respectively. The split SSS PCI group index patterns may be expressed in different sequence forms and may be configured to be mutually identified.

Furthermore, if a PCI group index is used to configure a pattern, the original object of a PCI for identifying a physical cell identity (or cell ID) must be guaranteed. However, if SSS PCI group indices are deployed by taking into consideration only the configuration of a pattern, information of a physical cell ID may be damaged. In order to prevent this problem, a method of determining a criterion on which an SSS PCI group index for configuring a pattern is selected (allocated or configured) according to a specific rule may be taken into consideration.

The method may mean that multiple PCI group indices forming one pattern denote the same cell ID if each PCI group index expresses each cell ID in a conventional technology. For example, as in FIG. 10, if 4 PCI group indices form a pattern within one time unit, the PCI group indices may be set (or assigned) according to a rule in which contiguous numbers can be expressed. In this case, cell IDs may be identified through a method not using the set PCI group index in another cell.

Furthermore, a method of clearly identifying symbol indices by designating the sequence between the set PCI group indices may be taken into consideration. For example, if 4 PCI group indices form a pattern within one time unit as in FIG. 10, an SSS PCI group index pattern may be designed so that a corresponding sequence forms information of the pattern by designating the sequence between the 4 PCI group indices. More specifically, if 4 PCI group indices "1, 2, 3, 4" are used to form a pattern, PCI group indices may be allocated in a first cell in the sequence of "1, 2, 3, 4", and the PCI group indices may be allocated in a second cell in the sequence of "1, 3, 2, 4."

Furthermore, a method of setting multiple time units as a time unit set and using one long SSS PCI group index pattern by combining the SSS PCI group index patterns of respective time units may also be taken into consideration. A method of configuring the time unit set may be applied to a case where time units are contiguously deployed in a time domain or a case where time units are distributed and deployed at a specific time. A long SSS PCI group index pattern configured through the method may be used to estimate each symbol index, and may be used to acquire information about the boundary of each time unit and/or the boundary of the time unit set.

Furthermore, a method of estimating a symbol index using an SSS PCI group index pattern and acquiring information about the boundary of a time unit may be applied to the case of a PSS. For example, in the case of a PSS, a method of configuring a PSS PCI index pattern using a physical cell ID may be taken into consideration. A method using a PSS PCI index pattern may be independently used, and may be combined with the aforementioned method using an SSS PCI group index pattern and used. In the case of the method of combining and using a PSS PCI index pattern and an SSS PCI group index pattern, after the PCI index pattern of a PSS is detected, an SSS PCI group index pattern may be determined through the detected pattern.

(3) Method Using Secondary Synchronization Code (SSC) Mapping Type Pattern (Third Embodiment)

In the legacy LTE system, a sequence generating an SSS consists of two M-sequences which are crossed, deployed and combined. The two M-sequences may be indicated as a secondary synchronization code 1 (SSC1) and a secondary synchronization code 2 (SSC2). If SSS sequences have a combination, two SSS sequences capable of being identified through an SSC mapping type, that is, a method of deploying the SSC1 and the SSC2 in an SSS, may be configured. That is, an SSC mapping type pattern (ore SSC mapping type index pattern) may be configured through the identification of two SSC mapping types.

Figure 11:
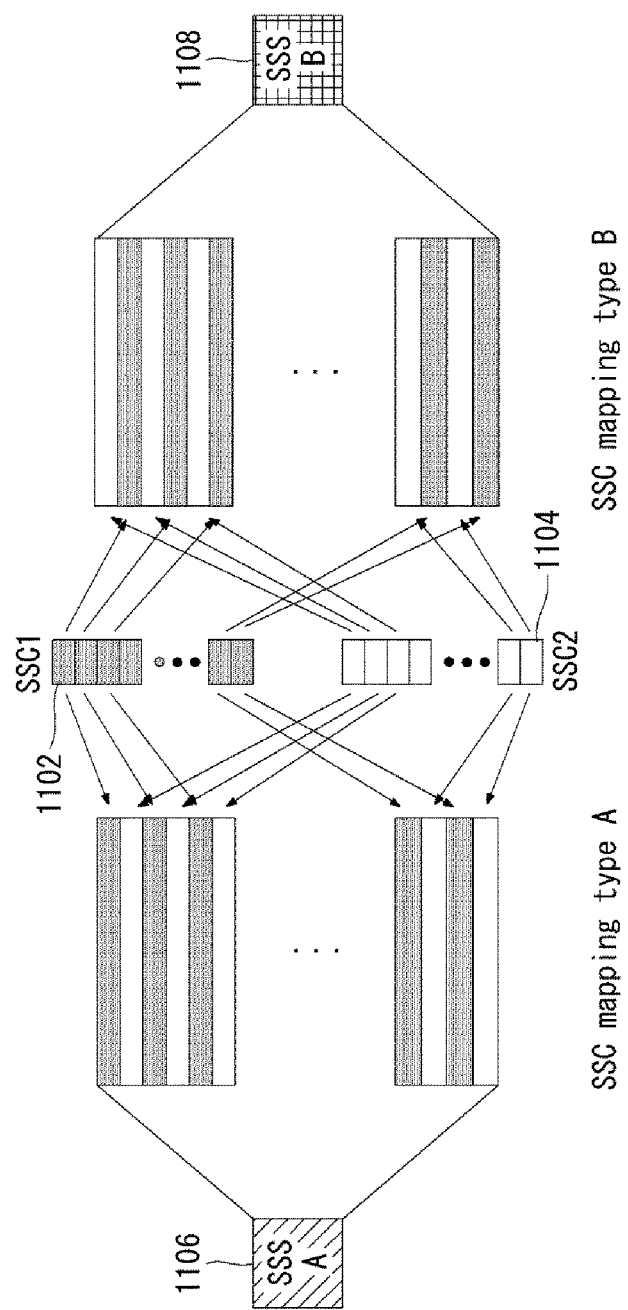
FIG. 11 illustrates an example of an SSS sequence configured according to a secondary synchronization code (SSC) mapping type to which the present invention may be applied.

FIG. 11 illustrates an example of an SSS sequence configured according to a secondary synchronization code (SSC) mapping type to which the present invention may be applied. FIG. 11 is only for convenience of description and does not limit the scope of the present invention.

Referring to FIG. 11, two sequences generating an SSS may be expressed as an SSC1 1102 and an SSC2 1104. In this case, two SSC mapping types may be classified according to the sequence that the SSCs are deployed. The two SSC mapping types may be expressed as an "SSC mapping type A" and an "SSC mapping type B." Accordingly, two SSSs (first SSS (SSS-A) 1106) and second SSS (SSS-B) 1108) classified by the two SSC mapping types may be generated. In this case, the first SSS 1106 and the second SSS 1108 consist of different SSS sequences. If the first SSS 1106 is expressed as "0 (i.e., index 0)" and the second SSS 1108 is expressed as "1 (i.e., index 1)", an SSS mapping type pattern may be expressed as a form of sequence (e.g., a bit-sequence) having "0" and "1."

In this case, a reception node (e.g., UE) may estimate an SSS mapping type pattern through a comparison between SSS mapping types (or SSS mapping type indices) at the position of each frequency resource to which an SSS may be allocated. The reception node may identify a symbol index within a time unit for each detected symbol through the estimated SSS mapping type pattern.

The SSS sequences (e.g., first SSS 1106 and second SSS 1108) configured through different SSC mapping types may be similar to a sequence having two different SSS PCI group indices (i.e., SSSs to which two different SSS PCI group index are allocated) described in the second embodiment. Accordingly, the contents of the method (second embodiment) of estimating a symbol index using the aforementioned SSS PCI group index pattern consisting of two SSS PCI group indices and acquiring information about the boundary of a time unit may be applied to a case where an SSC mapping type pattern is used (third embodiment) in the same manner.

(4) Method of Combining and Using the Aforementioned Methods (Fourth Embodiment)

The aforementioned methods (first embodiment, second embodiment and third embodiment) may be independently used or multiple methods may be combined and used. In this case, a pattern configured by combining multiple methods is called a coupled (or combined) SSS pattern (combined SSS pattern). If patterns using an SSS are combined and used, a combined SSS pattern for one time unit may be configured by combining two or more methods of an SSS hopping pattern (first embodiment), an SSS PCI group index pattern (second embodiment), and an SSC mapping type pattern (third embodiment).

The combined SSS pattern may be fully used according to one time unit length or may be used as a partial combined SSS pattern split according to a partial time unit length. Furthermore, if multiple time units are combined and used as one set of time units, a long combined SSS pattern in which multiple combined SSS patterns are coupled may be used. In this case, the combined SSS pattern needs to satisfy the requirements of each SSS hopping pattern, SSS PCI group index pattern and SSC mapping type pattern before it is coupled (or combined). Furthermore, a combination of patterns for classification between partial combined SSS patterns split within one time unit needs to be incorporated when the combined SSS patterns are designed.

Figure 12:
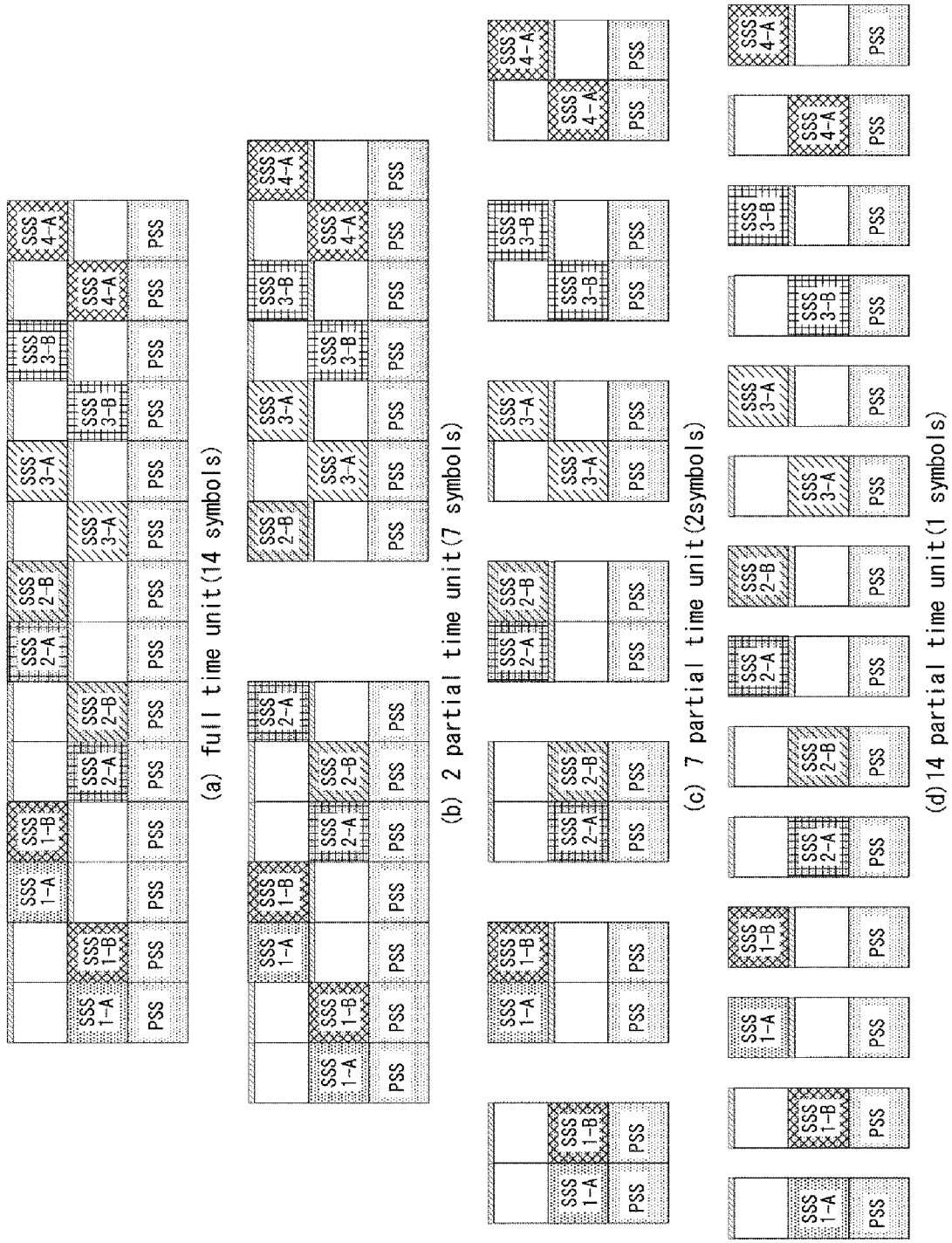
FIG. 12 illustrates examples of a combined SSS pattern and partial combined SSS patterns configured by combining patterns using an SSS to which the present invention may be applied.

FIG. 12 illustrates examples of a combined SSS pattern and partial combined SSS patterns configured by combining patterns using an SSS to which the present invention may be applied. FIG. 12 is only for convenience of description and does not limit the scope of the present invention.

Referring to FIG. 12, a case where if one time unit includes 14 symbols, a combined SSS pattern is configured by combining an SSS hopping pattern, an SSS PCI group index pattern and an SSC mapping type pattern and the combined SSS pattern is split into partial time units and used is assumed.

FIG. 12(a) illustrates a combined SSS pattern for a full time unit. FIG. 12(b) illustrates partial combined SSS patterns for partial time units, each one having 7 symbols. FIG. 12(c) illustrates partial combined SSS patterns for partial time units, each one having 2 symbols. FIG. 12(d) illustrates partial combined SSS patterns for partial time units, each one having 1 symbol (or constituent elements of a combined SSS pattern). In this case, a number index, such as an SSS 1-# and an SSS 2-#, indicates an SSS PCI group index. An English index, such as an SSS #-A and an SSS #-B, indicates the index of an SSC mapping type pattern. As shown in FIG. 12, the combined SSS pattern can be identified if all of time units are used (i.e., in a full time unit). Partial combined SSS patterns can also be identified with respect to each partial time unit.

According to the same method as that described above, a combined PSS pattern may be configured by combining a PSS hopping pattern and a PSS PCI index pattern. Furthermore, a combined PSS-SSS pattern may be configured by combining a combined PSS pattern and a combined SSS pattern. The combined PSS-SSS pattern needs to satisfy all of the requirements of patterns prior to combination.

Furthermore, if patterns using an SSS are combined and used, a method of differently combining the patterns depending on the size (or length) of a partial time unit may be taken into consideration. For example, if a pattern for one time unit (or subframe) including 14 symbols is configured, the pattern may be configured by applying only an SSS hopping pattern only when a time unit is used as one group without being split.

In contrast, a case where a partial time unit includes 2 symbol groups, each one having 7 symbols, may be assumed. In this case, a combined SSS pattern may be configured by combining an SSS PCI group pattern or SSC mapping type pattern with an SSS hopping pattern in order to improve the estimation of a symbol index and performance in acquiring information about the boundary of a time unit. Furthermore, if a partial time unit is configured using 7 symbol group, each one having 2 symbols, or different partial time units are configured using 14 symbols, a combined SSS pattern may be configured by combining two or more SSS patterns.

Figure 13:
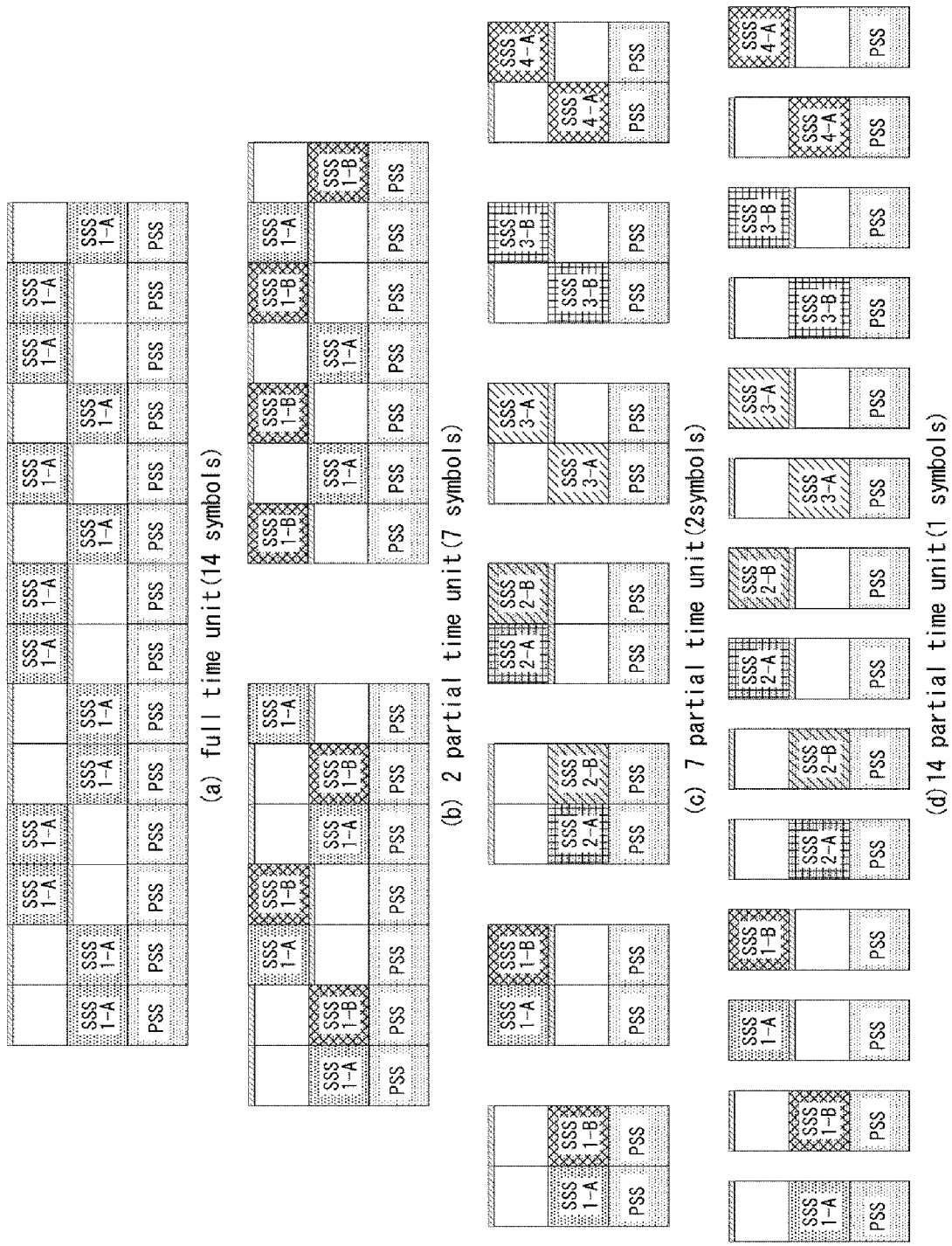
FIG. 13 illustrates examples of a combined SSS pattern and partial combined SSS patterns configured based on patterns using an SSS to which the present invention may be applied.

FIG. 13 illustrates examples of a combined SSS pattern and partial combined SSS patterns configured based on patterns using an SSS to which the present invention may be applied. FIG. 13 is only for convenience of description and does not limit the scope of the present invention.

Referring to FIG. 13, a case where a pattern using an SSS is differently combined depending on the size of a partial time unit is assumed.

FIG. 13(a) illustrates an SSS pattern for a full time unit. In this case, the SSS pattern includes only an SSS hopping pattern. In other words, the SSS pattern includes only the positions of frequency resources allocated to SSSs.

FIG. 13(b) illustrates partial combined SSS patterns for partial time units, each one having 7 symbols. In this case, the combined SSS pattern includes an SSS hopping pattern and an SSC mapping type pattern. In this case, an English index, such as an SSS #-A and an SSS #-B, indicates the index of the SSC mapping type pattern. For example, an SSS 1-A may be generated as an SSS sequence configured according to an SSC mapping type A, and an SSS 1-B may be generated as an SSS sequence configured according to an SSC mapping type B.

FIG. 13(c) illustrates partial combined SSS patterns for partial time units, each one having 2 symbols. In this case, the combined SSS pattern includes an SSS hopping pattern, an SSS PCI group index pattern, and an SSC mapping type pattern. In this case, a number index, such as an SSS 1-# and an SSS 2-#, indicates an SSS PCI group index. An English index, such as an SSS #-A and an SSS #-B, indicates the index of an SSC mapping type pattern. For example, a first SSS PCI group index is allocated to an SSS 1-A, which may be generated an SSS sequence configured according to an SSC mapping type A. A first SSS PCI group index is allocated is allocated to an SSS 2-B, which may be generated as an SSS sequence configured according to an SSC mapping type B.

FIG. 13(d) illustrates partial combined SSS patterns for partial time units, each one having 1 symbol (or constituent element of a combined SSS pattern). Even in this case, as in the case of FIG. 13(c), the combined SSS pattern includes an SSS hopping pattern, an SSS PCI group index pattern, and an SSC mapping type pattern.

If a stepwise (i.e., differently applied depending on the length of a partial time unit) combined SSS pattern is used as described above, whether to use information that needs to be used for other purposes like a PCI group index is determined depending on each step. Accordingly, there is an advantage in that the resource of information (e.g., a cell ID) that needs to be used for the other purpose can be efficiently managed.

Figure 14:
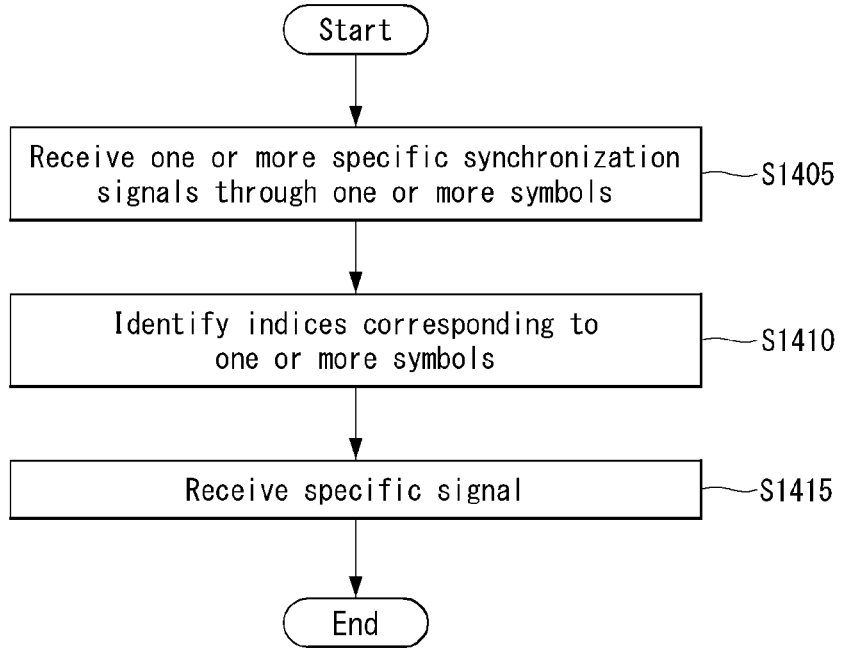
FIG. 14 illustrates an operational flowchart of a terminal that estimates the index of a symbol to which the present invention may be applied.

FIG. 14 illustrates an operational flowchart of a terminal that estimates the index of a symbol to which the present invention may be applied. FIG. 14 is only for convenience of description and does not limit the scope of the present invention.

Referring to FIG. 14, a case where in order to estimate the index of a symbol and/or the boundary of a specific time unit, a base station and a UE share a predefined pattern configured with (or including) multiple specific synchronization signals (e.g., PSS and/or SSS) for the specific time unit is assumed.

In step S1405, the UE receives one or more specific synchronization signals from the base station through one or more symbols. For example, the UE may receive at least one PSS and at least one SSS for each OFDM symbol. In this case, as described above, the at least one SSS may be the same or different.

After the UE receives the one or more specific synchronization signals, in step S1410, the UE may identify indices corresponding to the one or more symbols based on the predefined pattern shared with the base station and the received one or more specific synchronization signals. In this case, the indices corresponding to the one or more symbols may mean the indices of the symbols received by the UE from the base station.

More specifically, the UE may generate a specific pattern using the received one or more specific synchronization signals, and may identify the indices of the symbols in which the one or more specific synchronization signals have been received, respectively, by comparing the generated specific pattern with the predefined pattern. For example, as described above, the UE may identify (or determine) the indices of the symbols by comparing a sequence generated by classifying the one or more specific synchronization signals into "0" and "1" with a predefined bit-sequence.

In this case, the predefined pattern may mean the pattern using an SSS described in the first embodiment, the second embodiment, the third embodiment and/or the fourth embodiment. That is, the predefined pattern may be configured using at least one of a pattern defined based on the position of a frequency resource where each of multiple specific synchronization signals is mapped in a symbol, a pattern defined based on indices (e.g., PCI group index, PCI index) related to a physical cell identity assigned to the multiple specific synchronization signals, and a pattern defined based on sequences generating the multiple specific synchronization signals (e.g., a sequence generated through an SSC mapping type A and a sequence generated through an SSC mapping type B).

Furthermore, the specific pattern may be generated based on information indicating the positions of frequency resources where the one or more specific synchronization signals are mapped in respective symbols, specific index information assigned to the one or more specific synchronization signals, or sequence information generating the one or more specific synchronization signals.

Furthermore, in various embodiments of the present invention, a UE may further acquire information about the boundary of the specific time unit based on the identified indices.

After the UE identifies the indices corresponding to (or for) the received symbols, in step S1415, the UE receives a specific signal from the base station through a specific symbol determined using the identified indices. In this case, the specific signal may mean a physical broadcast channel (PBCH) received after a synchronization signal.

As described above, the UE may acquire timing information in a time domain (e.g., information about the indices of symbols and the boundary of a time unit (subframe, etc.)) using the identified indices. Accordingly, the UE can accurately receive a signal that may be subsequently transmitted by the base station based on the timing information. Furthermore, although the UE does not receive all of synchronization signals (i.e., synchronization signals transmitted through all of beams) from the base station, the UE may acquire timing information in the time domain using the predefined pattern and a partially received synchronization signal(s).

In the aforementioned part, the pattern consisting of a synchronization signal (e.g., PSS, SSS) has been illustrated as being used to acquire information about a symbol index and/or the boundary of a specific time unit (e.g., subframe). In this case, in various embodiments of the present invention, the pattern may be used for an object of indicating other information other than the information.

For example, the pattern may be used to deliver (or indicate) information about a cell identity (cell ID) to a UE. In this case, the information indicated by the pattern may be expressed as the cell identity, and different patterns may be shared between base stations using different cell identities.

For another example, the pattern may be used to deliver information about a system operation mode to a UE. In this case, information about a mapping relation between the system operation mode and a pattern may be shared between an base station and the UE or may be previously defined in a system.

In this case, the information about the system operation mode may mean (or include) frame structure configuration and/or TDD configuration information for time division duplex (TDD)/frequency division duplex (FDD). Furthermore, the information about the system operation mode may mean an identity for identifying a base station that uses the same synchronization signal, but supports a UE of a specific object and/or a specific capability (e.g., an identity classified depending on the category or a specific numerology, etc. of a UE). Furthermore, if a structure in which one or more systems may coexist is taken into consideration, the information about the system operation mode may mean an identity for classifying the operation modes of coexisting specific systems (e.g., in-band mode, guard-band mode and standalone mode). In this case, a structure in which one or more systems may coexist may mean a structure in which a legacy LTE system and an NR system coexist, a structure in which NB-IoT coexists within a legacy LTE band, etc.

General Apparatus to which the Present Invention May be Applied

Figure 15:
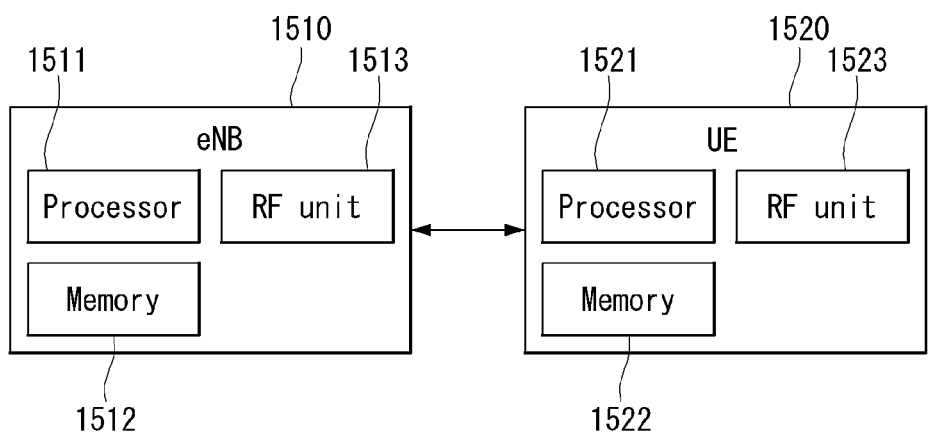
FIG. 15 illustrates a block diagram of a wireless communication apparatus according to an embodiment of the present invention.

FIG. 15 illustrates a block diagram of a wireless communication apparatus according to an embodiment of the present invention.

Referring to FIG. 15, the wireless communication system includes a network node 1510 and multiple UEs 1520.

The network node 1510 includes a processor 1511, a memory 1512, and a communication module 1513. The processor 1511 implements the functions, processes and/or methods proposed in FIGS. 1 to 14. The layers of a wired/radio interface protocol may be implemented by the processor 1511. The memory 1512 is connected to the processor 1511 and stores various types of information for driving the processor 1511. The communication module 1513 is connected to the processor 1511 and transmits and/or receives a wired/radio signal. In particular, if the network node 1510 is a base station, the communication module 1513 may include a radio frequency unit for transmitting/receiving radio signals.

The UE 1520 includes a processor 1521, a memory 1522 and a communication module 1523. The processor 1521 implements the functions, processes and/or methods proposed in FIGS. 1 to 14. The layers of a radio interface protocol may be implemented by the processor 1521. The memory 1522 is connected to the processor 1521 and stores various types of information for driving the processor 1521. The communication module 1523 is connected to the processor 1521 and transmits and/or receives a radio signal.

The memory 1512, 1522 may be located inside or outside the processor 1511, 1521 and may be connected to the processor 1511, 1521 by various known means. Furthermore, the network node (in the case of an eNB) 1510 and/or the UE 1520 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method of estimating the index of a symbol in a wireless communication system of the present invention has been illustrated based on an example in which it is applied to the 3GPP LTE/LTE-A systems, but may be applied to various wireless communication system, such as a 5G system, in addition to the 3GPP LTE/LTE-A systems.

The invention claimed is:

1. A method of estimating an index of a symbol in a wireless communication system, the method performed by a user equipment and comprising:
receiving, from a base station, one or more specific synchronization signals through one or more symbols;
identifying indices corresponding to the one or more symbols, based on a predefined pattern configured with multiple specific synchronization signals for a specific time unit and the received one or more specific synchronization signals; and receiving, from the base station, a specific signal through a specific symbol determined using the identified indices, wherein each of the one or more specific synchronization signals and the multiple specific synchronization signals comprises two or more secondary synchronization signals (SSSs) per a symbol, and wherein the predefined pattern is based on an index related to a physical cell identity assigned to the SSS, an index related to a mapping type for a generation of the SSS and a hopping pattern of the SSS in frequency domain.

2. The method of claim 1, wherein the predefined pattern is configured using at least one of a pattern defined based on a position of a frequency resource in which each of the multiple specific synchronization signals is mapped in a symbol, a pattern defined based on indices related to a physical cell identity assigned to the multiple specific synchronization signals, and a pattern defined based on sequences generating the multiple specific synchronization signals.

3. The method of claim 2, wherein the predefined pattern comprises a first partial pattern for a first partial time unit and a second partial pattern for the second partial time unit, and wherein the first partial pattern and the second partial pattern are respectively represented by different information.

4. The method of claim 3, wherein the identifying the indices corresponding to the one or more symbols comprises:

generating a specific pattern using the received one or more specific synchronization signals, and identifying indices of symbols in which the one or more specific synchronization signals are respectively received, by comparing the generated specific pattern with the predefined pattern.

5. The method of claim 4, wherein the specific pattern is generated based on information indicating the position of the frequency resource in which each of the one or more specific synchronization signals is mapped in the symbol, specific index information assigned to the one or more specific synchronization signals, or sequence information generating the one or more specific synchronization signals.

6. The method of claim 2, wherein the position of the frequency resource is determined based on a difference between a position of a primary synchronization signal (PSS) and a position of the SSS mapped to each symbol, in a frequency domain.

7. The method of claim 2, wherein the indices related to the physical cell identity comprise physical layer cell identity group indices assigned to respective SSSs.

8. The method of claim 2, further comprising:

acquiring information for a boundary of the specific time unit, based on the identified indices.

9. A user equipment for estimating an index of a symbol in a wireless communication system, the user equipment comprising:

a transceiver configured to transmit and receive radio signals; and a processor functionally connected to the transceiver, wherein the processor controls to:

receive, from a base station, one or more specific synchronization signals through one or more symbols, identify indices corresponding to the one or more symbols, based on a predefined pattern configured with multiple specific synchronization signals for a specific time unit and the received one or more specific synchronization signals, and receive, from the base station, a specific signal through a specific symbol determined using the identified indices, wherein each of the one or more specific synchronization signals and the multiple specific synchronization signals comprises two or more secondary synchronization signals (SSSs) per a symbol, and wherein the predefined pattern is defined based on an index related to a physical cell identity assigned to the SSS, an index related to a mapping type for a generation of the SSS and a hopping pattern of the SSS in frequency domain.

10. The user equipment of claim 9, wherein the predefined pattern is configured using at least one of a pattern defined based on a position of a frequency resource in which each of the multiple specific synchronization signals is mapped in a symbol, a pattern defined based on indices related to a physical cell identity assigned to the multiple specific synchronization signals, and a pattern defined based on sequences generating the multiple specific synchronization signals.

11. The user equipment of claim 10, wherein the predefined pattern comprises a first partial pattern for a first partial time unit and a second partial pattern for the second partial time unit, and wherein the first partial pattern and the second partial pattern are respectively represented by different information.

12. The user equipment of claim 11, wherein the processor controls to:

generate a specific pattern using the received one or more specific synchronization signals; and identify indices of symbols in which the one or more specific synchronization signals are respectively received, by comparing the generated specific pattern with the predefined pattern.

13. The user equipment of claim 12, wherein the specific pattern is generated based on information indicating the position of the frequency resource in which each of the one or more specific synchronization signals is mapped in the symbol, specific index information assigned to the one or more specific synchronization signals or sequence information generating the one or more specific synchronization signals.

14. The user equipment of claim 10, wherein the position of the frequency resource is determined based on a difference between a position of a primary synchronization signal (PSS) and a position of the SSS mapped to each symbol, in a frequency domain.

15. The user equipment of claim 10, wherein the indices related to the physical cell identity comprise physical layer cell identity group indices assigned to respective SSSs.

* * * * *